UNITED STATES PATENT OFFICE.

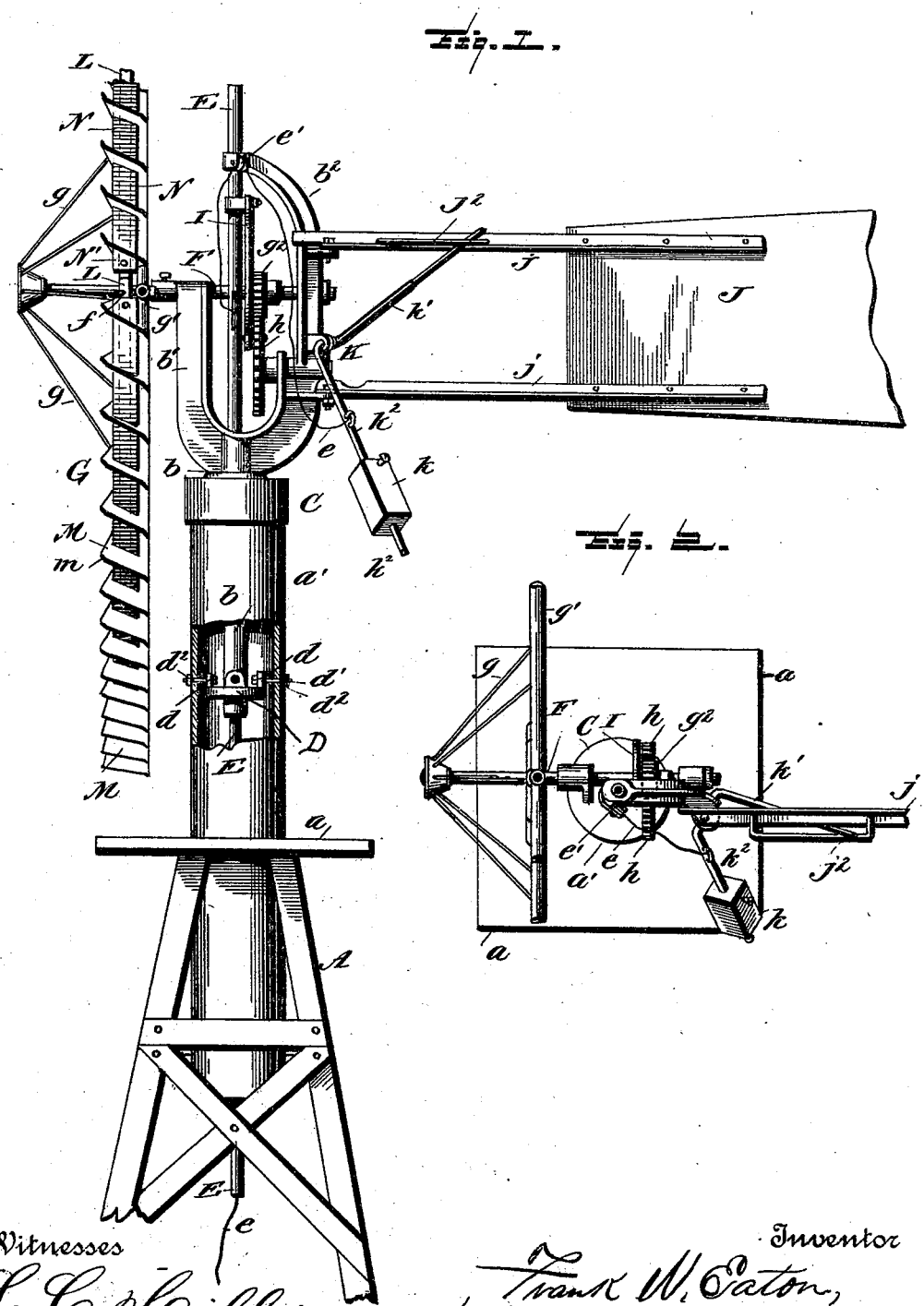

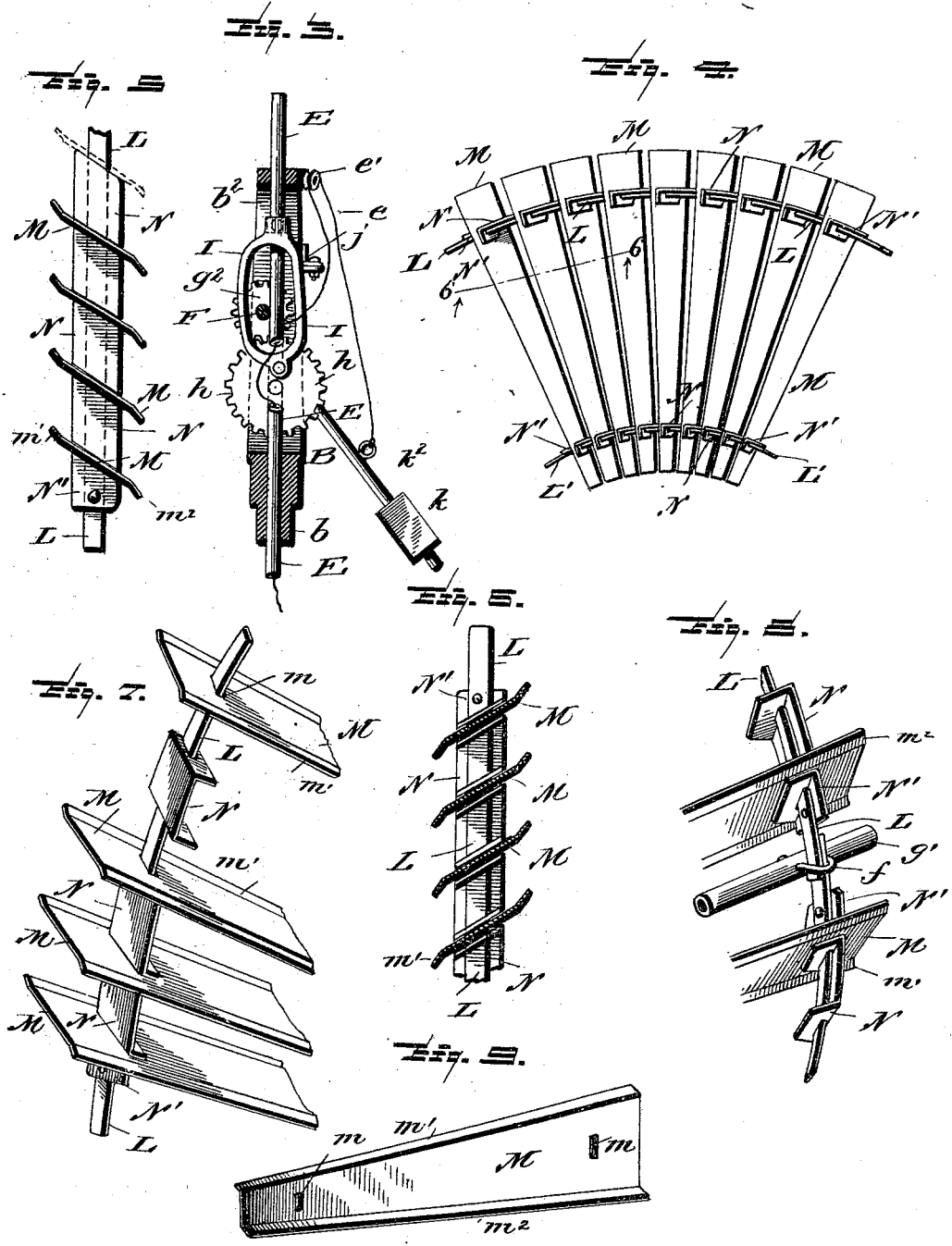

FRANK W. EATON, OF NESS CITY, KANSAS.

WINDMILL.

SPECIFICATION forming part of Letters Patent No. 514,848, dated February 13, 1894.

Application filed March 31, 1893. Serial No. 468,449. (No model.)

*To all whom it may concern:*

Be it known that I, FRANK W. EATON, a citizen of the United States, residing at Ness City, in the county of Ness and State of Kansas, have invented certain new and useful Improvements in Windmills; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to wind mills of that class commonly known as vertical solid wheel.

The object of the invention is simplicity in the construction of the wheel which is composed of sections, a single fastening serving to secure the ends of two portions of the rim sections to the arms. The paddles or wings are strung upon arc shaped strips and are given the proper pitch and spaced the required distance apart by filling pieces which are also strung upon the said strips.

A further object of the invention is to enable the paddles or wings being formed of sheet metal to withstand the wind pressure under ordinary use without collapsing, the intermediate filling pieces strengthening and bracing the rim strips and the wings.

A further object of the invention is the interposition of gearing between the wheel shaft and the crank for operating the pump rod so that the mill will, if required, be capable of performing efficient work in a light wind.

A still further object of the invention is to bring the mill under the control of the operator by simple and efficient means so that the mill may be caused to run at any required speed in a wind of given velocity, or at a given speed in a variable wind and which at the same time will automatically throw the engine out of gear should the force of the wind increase beyond the means provided to hold the mill in the wind.

A still further object of the invention is to provide a wind mill which will be simple in the construction and the arrangements of its parts, durable, and easily accessible in all its parts for purposes of cleaning, repairing and oiling.

The improvement consists, essentially, of the novel construction of the wheel, the gearing between the wheel shaft and the pump rod, the governor mechanism, and the peculiar construction and combination of the parts which will be hereinafter more fully set forth and claimed, and which are shown in the annexed drawings, in which—

Figure 1 is a side elevation of a wind mill embodying the invention, the lower portion of the tower, the top portion of the wind wheel and the end of the tail vane being broken away. Fig. 2 is a top plan view of the mill, parts of the wind wheel and the tail vane being broken away. Fig. 4 is a side elevation of a section composing the wind wheel. Fig. 3 is a front view of the gearing and the pitman connecting the gearing with the pump rod. Fig. 5 is a detail end view showing the filling pieces between the wings or blades. Fig. 6 is a detail section on the line 6—6 of Fig. 4 looking in the direction of the arrow showing the inner sides of the filling pieces. Fig. 7 is a detail view showing the manner of stringing the blades or wings and the filling pieces on the strips which constitute the rims. Fig. 8 is a detail view of the fastening for securing the opposing ends of two rim section strips together, showing the application of the same. Fig. 9 is a detail view of a wing or paddle. Fig. 10 is a detail view of a filling piece.

The tower or derrick A, is of usual construction and is provided with a platform $a$ from which rises a tubular post or standard $a'$ protected at its top by a metal cap C which is centrally apertured to permit the passage of the tubular stem B attached to or forming part of the casting or head B which supports the operating parts of the mill. The middle portion of this cap C is thicker and projects upward a short distance around the aperture to form a bearing for an annular enlargement or shoulder at the upper end of the tubular stem $b$ to turn upon when the engine is shifting to the wind. The lower end of the stem $b$ obtains a bearing in a casting D within the post or standard $a'$. This casting has ears $d$ on its four sides through which pass bolts $d'$. The outer ends of these bolts pass through the sides of the standard $a'$ and have nuts $d'$ on their projecting ends for the purpose of adjusting the said casting to center and plumb the mill in the usual manner.

The head or casting B comprises two standards $b'$ and $b^2$ of unequal length. The standard $b^2$ projects above the standard $b'$ and curves at its upper end which is provided with a guide directly over the tubular stem $b$ to receive the upper end of the pump rod E. The lower end of this pump rod works in the tubular stem $b$ and is guided in its movements thereby, and is made tubular to carry the operating cord $e$ past the lower end of the stem $b$.

The wheel shaft F is journaled in bearings at the top of the standard $b'$. The wind wheel G is secured on the outer end of the shaft and is braced by stay rods $g$ which extend from the extremity of the shaft to a proper point in the length of the arms $g'$ of the wheel A pinion $g^2$ on the shaft F meshes with a gear wheel $h$ on a short shaft H suitably journaled in the standard $b^2$ parallel with the shaft F. This gear wheel $h$ carries the crank or wrist pin to which one end of the pitman I is attached for transmitting motion to the pump rod, the other end of the said pitman being connected to the pump rod E in any approved manner. This pitman is constructed to encircle the shaft F to evenly distribute the strain on each side thereof.

The tail vane J is pivotally connected by means of two arms $jj$, with the standard $b^2$ so as to fold parallel with the wheel G when the mill is out of gear. The upper arm $j$ is projected a short distance beyond the pivotal connection of the said arm with the standard $b^2$ to bear laterally against the said standard to hold the mill full in the wind. A keeper $j^2$ on the upper vane arm $j$ receives the upper end of a lever K which is pivoted between its ends to the standard $b^2$. The tail vane is set to one side of the axis of the wind wheel to permit of the latter going out of the wind should the same blow a gale or reach an unusual velocity, thereby preventing injury to the mill in a high wind.

The lever K is weighted at one end, the weight $k$ being adjustable on the arm $k^2$ of the lever to vary the force to hold the mill into the wind. The arm $k'$ extends upwardly and inclines inwardly from the perpendicular and engages with the keeper $j^2$. The arm $k^2$ inclines outwardly and downwardly at an obtuse angle to the arm $k'$ and has the operating cord $e$ attached thereto by means of which the engine is thrown out of gear. This cord passes over a guide pulley $e'$ at the upper end of the standard $b^2$ and thence down within convenient reach from the ground to be drawn upon to throw the engine out of gear or more or less in the wind. For a short distance the cord $e$ passes through the pump rod to clear the bearings at the ends of the tubular stem $b$.

The wind wheel is constructed of a number of independent sections which are secured together and to the arms $g'$ by suitable fastenings. Arc shaped strips L and L' constitute portions of the outer and inner rims for securing together the paddles or blades M which are strung thereon and separated by filling pieces N. The paddles or blades M have openings $m$ near each end to receive the strips L and L' and are formed from sheet metal and have flanges $m'$ and $m^2$ at their edges which extend in opposite directions to strengthen and stiffen the blades and increase the action of the wind thereon. These blades taper in width and have their inner ends set closer together than the outer ends in the organized wheel. The filling pieces N have their opposite ends parallel and oblique to correspond to the pitch of the blades against which the said oblique ends abut. These oblique ends are flanged, the flanges $n$ having openings $n'$ to receive the strips L and L' which are so disposed that the strips will touch that portion of the filling pieces between the flanges and be braced thereby. The flanges $n$ bearing against the blades between the flanged edges will brace and stiffen the same in the direction of their width. These pieces N will be stamped out of sheet metal and being of like and uniform size will insure an equal spacing of the blades or paddles and each having the same pitch. It will be understood that the filling pieces for the inner ends of the paddles will be proportionally smaller than the filling pieces for the outer ends.

In constructing a section the paddles and the filling pieces are alternately strung upon the strips and are held in place by having the extreme or end pieces N riveted or otherwise secured to the strips. The ends of the strips L and L' project a short distance so as to overlap and be secured to the arms $g'$ by the same fastenings $f$ which also secure the said overlapping ends together. The fastenings $f$ are hooked bolts having their threaded ends passed through the arms $g'$ and provided with nuts by means of which the fastenings are tightened. The hooked ends embrace the overlappings ends of the rim section strips.

Having thus described my invention, what I claim to be new, and desire to secure by Letters Patent, is—

1. In a wind engine the combination with the tail vane, of a lever pivoted between its ends, one end extending upwardly and inclining from the perpendicular to the rear and loosely engaging with the tail vane, the other end extending outwardly and downwardly at an obtuse angle and counterbalanced, substantially as and for the purposes set forth.

2. A wind wheel constructed of sections, and having the rim sectional strips projected and overlapped, filling pieces with their opposite ends oblique and flanged and a single fastening to secure the overlapping ends of the said strips together and to the arms of the wheel, substantially as described.

3. A wind wheel comprising inner and outer strips, paddles and filling pieces alternately strung upon the said strips, with their opposite ends oblique and flanged substantially as described.

In testimony whereof I affix my signature in presence of two witnesses.

FRANK W. EATON.

Witnesses:
G. W. EIBERT,
CHAS. E. CLARKSON.